(12) United States Patent
Nicholls et al.

(10) Patent No.: US 10,379,356 B2
(45) Date of Patent: Aug. 13, 2019

(54) ACCOMMODATION BASED OPTICAL CORRECTION

(71) Applicant: Facebook Technologies, LLC, Menlo Park, CA (US)

(72) Inventors: William Aaron Nicholls, Seattle, WA (US); Marina Zannoli, Seattle, WA (US); Douglas Robert Lanman, Bellevue, WA (US); Nicholas Daniel Trail, Bothell, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/482,564

(22) Filed: Apr. 7, 2017

(65) Prior Publication Data
US 2017/0293146 A1   Oct. 12, 2017

Related U.S. Application Data

(60) Provisional application No. 62/319,741, filed on Apr. 7, 2016.

(51) Int. Cl.
*G02B 27/01* (2006.01)
*G02B 27/00* (2006.01)

(52) U.S. Cl.
CPC ..... *G02B 27/0172* (2013.01); *G02B 27/0093* (2013.01); *G02B 2027/011* (2013.01);
(Continued)

(58) Field of Classification Search
CPC .. G02B 27/0172; G02B 27/017; G02B 27/01; G02B 27/0093; G02B 2027/011; G02B 2027/0138; G02B 2027/0187
(Continued)

(56) References Cited

U.S. PATENT DOCUMENTS 5,768,443 A   6/1998   Michael et al.
5,801,885 A   9/1998   Togino
(Continued)

FOREIGN PATENT DOCUMENTS

JP   H0764013 A   3/1995
JP   3298081 B2   7/2002
(Continued)

OTHER PUBLICATIONS

European Extended Search Report, European Application No. 16161315.3, dated Aug. 2, 2016, 10 pages.
(Continued)

*Primary Examiner* — William R Alexander
(74) *Attorney, Agent, or Firm* — Fenwick & West LLP

(57) ABSTRACT

An auto-focus head-mounted display (HMD) dynamically generates aberration-adjusted images based on measured accommodation of user's eye(s). An aberration-adjusted image is an image distorted to correct aberrations that would otherwise occur at a retina of the user due to image light passing through optics of the HMD. The aberration-adjusted image corrects the aberrations of the HMD and "accounts" for the aberrations of the eye so that the resulting retinal image is free of optical aberrations due to the HMD but preserves correct eye optical aberrations that are correlated with a current accommodative state of the eye.

20 Claims, 3 Drawing Sheets

(52) U.S. Cl.
CPC .............. *G02B 2027/0138* (2013.01); *G02B 2027/0187* (2013.01)

(58) Field of Classification Search
USPC ........................................................ 359/630
See application file for complete search history.

(56) References Cited

U.S. PATENT DOCUMENTS

| | | | |
|---|---|---|---|
| 5,892,570 A * | 4/1999 | Stevens | A61B 3/024 351/222 |
| 9,915,824 B2 * | 3/2018 | Schowengerdt | G06T 13/40 |
| 9,939,643 B2 * | 4/2018 | Schowengerdt | G06T 13/40 |
| 2001/0017687 A1 | 8/2001 | Rodriguez et al. | |
| 2006/0210111 A1 | 9/2006 | Cleveland et al. | |
| 2007/0183293 A1 | 8/2007 | Murata et al. | |
| 2008/0062164 A1 | 3/2008 | Bassi et al. | |
| 2010/0141852 A1 | 6/2010 | Jurik et al. | |
| 2010/0177163 A1 | 7/2010 | Yang et al. | |
| 2011/0075257 A1 * | 3/2011 | Hua | G02B 27/017 359/464 |
| 2012/0249797 A1 * | 10/2012 | Haddick | G06F 1/163 348/158 |
| 2013/0050070 A1 | 2/2013 | Lewis et al. | |
| 2013/0176533 A1 | 7/2013 | Raffle et al. | |
| 2013/0314793 A1 * | 11/2013 | Robbins | G02B 5/18 359/573 |
| 2014/0092139 A1 | 4/2014 | Sullivan et al. | |
| 2014/0153102 A1 | 6/2014 | Chang | |
| 2014/0177063 A1 | 6/2014 | Wang et al. | |
| 2014/0211193 A1 | 7/2014 | Bloom et al. | |
| 2014/0368793 A1 | 12/2014 | Friedman et al. | |
| 2015/0062558 A1 | 3/2015 | Koppal et al. | |
| 2015/0102981 A1 | 4/2015 | Lee et al. | |
| 2015/0181096 A1 | 6/2015 | Kasai et al. | |
| 2015/0212326 A1 | 7/2015 | Kress et al. | |
| 2015/0222883 A1 | 8/2015 | Welch | |
| 2015/0237336 A1 | 8/2015 | Sylvan et al. | |
| 2015/0286070 A1 * | 10/2015 | Aikawa | G02C 7/025 351/159.76 |
| 2015/0288944 A1 | 10/2015 | Nistico et al. | |
| 2015/0312560 A1 * | 10/2015 | Deering | G02B 13/0085 345/1.3 |
| 2015/0346495 A1 | 12/2015 | Welch et al. | |
| 2016/0005179 A1 | 1/2016 | Petyushko et al. | |
| 2016/0091720 A1 | 3/2016 | Stafford et al. | |
| 2016/0103419 A1 * | 4/2016 | Callagy | G03H 1/0005 348/40 |
| 2016/0219269 A1 | 7/2016 | Tekolste | |
| 2016/0295178 A1 | 10/2016 | Damberg et al. | |
| 2016/0371886 A1 | 12/2016 | Thompson et al. | |
| 2017/0161951 A1 | 6/2017 | Fix et al. | |
| 2017/0213388 A1 | 7/2017 | Margolis et al. | |
| 2017/0299869 A1 | 10/2017 | Urey et al. | |
| 2018/0133593 A1 | 5/2018 | Wilson | |

FOREIGN PATENT DOCUMENTS

| | | |
|---|---|---|
| JP | 2014-219621 A | 11/2014 |
| KR | 10-2013-0011692 A | 1/2013 |
| KR | 10-2014-0144510 A | 12/2014 |
| WO | WO 2013/140697 | 3/2012 |
| WO | WO 2015/18441 A1 | 12/2015 |

OTHER PUBLICATIONS

Robinett, W., "Computational Model for the Stereoscopic Optics of a Head-Mounted Display," Proceedings of SPIE Stereoscopic Displays and Applications II, Jan. 1991, pp. 140-160, vol. 1457.

State, A. et al., "Dynamic Virtual Convergence for Video See-Through Head-Mounted Displays: Maintaining Maximum Stereo Overlap Throughout a Close-Range Work Space," IEEE and ACM International Symposium on New Augmented Reality, Oct. 29-30, 2001, pp. 137-146.

Machine translated JP2014-219521; Date of publication: Nov. 20, 2014.

PCT International Search Report and Written Opinion, PCT Application No. PCT/US2017/012346, dated Mar. 30, 2017, 13 pages.

PCT International Search Report and Written Opinion, PCT Application No. PCT/US2016/059938, dated Dec. 20, 2016, 12 pages.

PCT International Search Report and Written Opinion, PCT Application No. PCT/US2016/017397, dated Aug. 16, 2016, 21 pages.

U.S. Appl. No. 15/407,701, filed Jan. 17, 2017, Inventors Nicholas Daniel Trail et al. [Copy Not Enclosed].

U.S. Appl. No. 14/963,126, filed Dec. 8, 2015, Inventors Douglas Robert Lanman et al. [Copy Not Enclosed].

U.S. Appl. No. 15/366,412, filed Dec. 1, 2016, Inventor Nicholas Daniel Trail. [Copy Not Enclosed].

U.S. Appl. No. 14/963,109, filed Dec. 8, 2015, Inventors Douglas Robert Lanman et al. [Copy Not Enclosed].

United States Office Action, U.S. Appl. No. 15/456,388, dated Feb. 20, 2019, 29 pages.

Japan Patent Office, Office Action, Japanese Patent Application No. 2018-528282, dated Dec. 11, 2018, six pages.

\* cited by examiner

ACCOMMODATION BASED OPTICAL CORRECTION

CROSS-REFERENCE TO RELATED APPLICATIONS

This application claims the benefit of U.S. Application No. 62/319,741, filed Apr. 7, 2016 which is incorporated by reference in its entirety.

BACKGROUND

The present disclosure generally relates to enhancing images from electronic displays, and specifically to generate aberration corrected images based in part on a measured accommodation of a user's eye.

Virtual reality (VR) headsets can be used to simulate virtual environments. These headsets include optics which may introduce aberrations into images presented to the user. Additionally, optics of a user's eye (e.g., shape of the cornea) can introduce aberrations in images being focused on the eye's retina. Conventional VR headsets are often unable to fully compensate for aberrations introduced by the headset optics and to account for the optical metrics of user's eyes when rendering content.

SUMMARY

An auto-focus head-mounted display (HMD) dynamically generates aberration-adjusted images based on measured accommodation of user's eye(s). An aberration-adjusted image is an image distorted to correct aberrations that would otherwise occur at a retina of the user due to image light passing through optics of the HMD. The aberration-adjusted image corrects the aberrations of the HMD and "accounts" for the aberrations of the eye so that the resulting retinal image is free of optical aberrations due to the HMD but preserves correct eye optical aberrations that are correlated with a current accommodative state of the eye. The HMD includes an eye accommodation sensor, a varifocal element (i.e., an element that mechanically changes a distance between a lens system and screen, that can be electrically activated to change the optical depth of the presented image, changes shape of one or more lenses in the lens system, etc.), and a rendering module.

Accordingly, the HMD in one embodiment determines a position and orientation of the HMD for a user wearing the HMD and viewing content displayed thereon. For each frame of content (e.g., a virtual scene, etc.), an image is identified for rendering based on the determined position and orientation of the HMD. The HMD further determines a position of the eye (e.g., eye orientation, eye focus position/distance, etc.) for each eye of the user and determines a location where the user's eyes find accommodation (e.g., accommodation information) based on the eye position for each eye of the user. Since optical aberrations change based on the user's viewing angle relative to the optical axis of the optics block, optical aberration information is determined for the determined eye position of each eye of the user. Accordingly, based on the accommodation information and the determined optical aberration information for the determined eye position of the user, a focus state for the optics block is determined. The focus state includes information for pre-distorting the image of the virtual scene such that the optical error introduced by the optics block cancels the pre-distortion, thereby, resulting in an aberration corrected image of the virtual scene. Accordingly, the HMD tracks the eyes of the user to an updated position for each additional image and updates the focus state for the updated position.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

As individual lenses and other optical components are subject to various types of optical errors, the virtual scene presented by the HMD may be altered depending on a state of the optics block to compensate or correct for optical errors. A state (also referred to as a focus state) is a configuration of optical elements within the optics block that creates a specific focal distance for the optics block.

For example, field curvature commonly associated with convex lenses tends to bend light rays near the edges of a convex lens more sharply inward relative to light rays near the center of the convex lens. The resulting distortion from the convex lens makes a virtual scene viewed through the convex lens appear as if it is viewed underwater or through a fisheye lens, which may detract from the illusion of the virtual scene created by a virtual reality system. Distortion caused by the optics block tends to be non-linear and may change based on the state of the optics block.

To correct for distortion caused by a focus state of the optics block, optics of a user's eye, other optical aberrations, or some combination thereof, the virtual scene may be rendered with pre-distortion based on previously modeled distortion caused by the optics block. Thus, as light from the display screen passes through the optics block and optics of a user's eye (e.g., cornea and crystalline lens), distortion caused by the optics block and the optics of the user's eye cancels or corrects the pre-distortion so the virtual scene appears undistorted when viewed from an exit pupil of the HMD. To model the distortion caused by the optics block and optics of users eyes calibration data is collected from various users that maps aberrations to specific amounts of eye accommodation. For example, the calibration data may map an amount of field curvature, chromatic aberration, spherical aberration, etc., that is present for a user of a specific demographic profile (e.g., gender, race, age) while the user's eyes are focused at objects presented at different distances from the user. The eye accommodation sensor measures accommodation of one or both eyes of the user. Using the measured accommodation, the HMD determines a rendering adjustment for the virtual scene and focus position for the varifocal element.

System Overview

Figure 1:
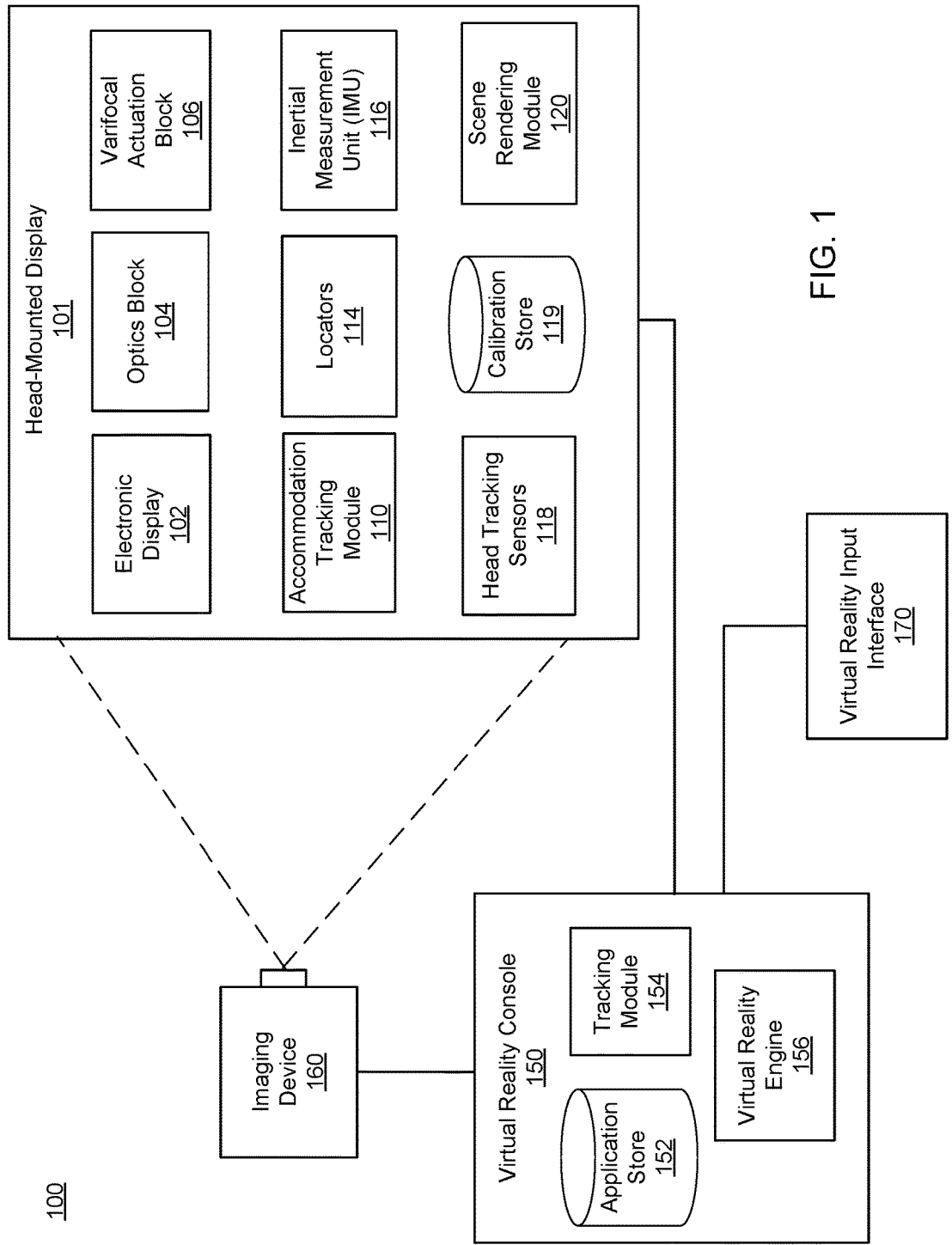
FIG. 1 shows an example virtual reality system, in accordance with at least one embodiment.

FIG. 1 is virtual reality (VR) system 100, in accordance with at least one embodiment. In this example, the VR system environment includes an HMD 101, imaging device 160, and VR input interface 170, which are each coupled to VR console 150. While FIG. 1 shows a single HMD 101, a single imaging device 160, and a single VR input interface 170, in other embodiments, any number of these components may be included in the system. For example, there may be multiple HMDs 100 each having an associated VR input interface 170 and being monitored by one or more imaging devices 160, with each HMD 101, VR input interface 170, and imaging devices 160 communicating with the VR console 150. In alternative configurations, different and/or additional components may also be included in the VR system 100.

The HMD 101 is a Head-Mounted Display that presents content to a user. Example content includes images, video, audio, or some combination thereof. Audio content may be presented via a separate device (e.g., speakers and/or headphones) external to the HMD 101 that receives audio information from the HMD 101, the VR console 150, or both. Some embodiments of the HMD 101 have different modules than those described here. Similarly, the functions can be distributed among the modules in a different manner than is described here. In some embodiments, the HMD 101 may also act as an augmented reality (AR) and/or mixed reality (MR) headset. For example, when the HMD 101 acts as an AR headset, the HMD 101 augments views and of a physical, real-world environment with computer-generated elements (e.g., images, video, sound, etc.).

The HMD 101 includes an electronic display 102, an optics block 104, a varifocal actuation block 106, an accommodation tracking module 110, one or more locators 114, an internal measurement unit (IMU) 116, a head tracking sensors 118, a calibration store 119, and a scene rendering module 120.

The optics block 104 directs light from the electronic display 102 to an exit pupil for viewing by a user using one or more optical elements, such as apertures, Fresnel lenses, convex lenses, concave lenses, reflecting surfaces, filters, and so forth, and may include combinations of different optical elements. In some embodiments, one or more optical elements in optics block 104 may have one or more coatings, such as anti-reflective coatings. Magnification of the image light by the optics block 104 allows the electronic display 102 to be physically smaller, weigh less, and consume less power than larger displays. Additionally, magnification of the image light may increase a field of view of the displayed content. For example, the field of view of the displayed content is such that the displayed content is presented using almost all (e.g., 150 degrees diagonal), and in some cases all, of the user's field of view.

The optics block 104 may be designed to correct optical error, such as two dimensional optical errors, three dimensional optical errors, or some combination thereof. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, comatic aberration, field curvature, astigmatism, or any other type of three-dimensional optical error. In some embodiments, content provided to electronic display 102 for display is pre-distorted, and optics block 104 corrects the distortion when it receives image light from electronic display 102 generated based on the content.

The varifocal actuation block 106 includes a varifocal element that causes the optics block 104 to vary the focal length (or optical power) or apparent back focal length (principal plane location of the optics relative to the electronic display 102) of the HMD 101. By varying the focal length of the optics block 103, the varifocal actuation block 106 changes a focus state of the optics block 104. In some embodiments, the varifocal actuation block 106 physically changes the distance between the electronic display 102 and the optics block 104 by moving the electronic display 102, the optics block 104, one or more optical elements within the optics block 104, or some combination thereof. Alternatively, the varifocal actuation block 106 changes the shape or optical power of one or more lenses in the optics block 104. For example, the varifocal actuation block 106 changes the optical power or shape of the one or more lenses using shape-changing polymer lenses, electrowetting methods with liquid lenses, Alvarez-Lohmann lenses, deformable membrane mirrors, liquid crystal (electroactive) lenses, or phase-only spatial light modulators (SLMs), or any other suitable component. Additionally, moving or translating two lenses relative to each other may also be used to change the focal length of HMD 101. Thus, the varifocal actuation block 106 may include actuators or motors that move the electronic display 102 and/or the optics block 104 on a track to change the distance between them or may include actuators and other components or mechanisms for changing the shape of one or more lenses included in the optics block 104. The varifocal actuation block 106 may include a focus state estimator (via encoder or other means), which allows the current position of the varifocal system to be determined and/or future focus state to be predicted based on current and past state history. The varifocal actuation block 106 may be separate from or integrated into optics block 104 in various embodiments. HMDs including varifocal elements are further described in U.S. patent application Ser. No. 14/963, 109, filed on Dec. 8, 2015, which is hereby incorporated by reference in its entirety.

Accommodation tracking module 110 tracks accommodation of one or both eyes of user of HMD 101. Accommodation is a mechanism by which the eye changes its refractive power by altering the shape of its crystalline lens to maintain a clear image or focus on an object as its distance varies from the eye. The accommodation tracking module 110 measures the accommodation of one or both of the user's eyes to generate accommodation information. The accommodation tracking module 110 may include an infrared (IR) source (e.g., a laser source), a detector, and processing module. The IR laser source actively illuminates portions of the user's eyes. The detector captures images of the illuminated portions, and the processing module determines a shape of the crystalline lens using the captured images. The processing module then determines accommodation information using the determined shape. For example, the processing module may use a model that maps shape of a crystalline lens to respective accommodation information. In some embodiments, the accommodation tracking module 110 measures accommodation using one of multiple techniques such as the Scheiner principle, wavefront aberrometry, image quality analysis, a Badal optometer, or some combination thereof. Accommodation information describes an amount of accommodation of an eye. Accommodation information may include, e.g., an optical power of the eye, a distance from the eye at which the eye is focused, a maximum amplitude of accommodation, a range of accommodation, or some combination thereof.

In some embodiments, the accommodation tracking module 110 determines real-time wavefront aberrations of the eye. For example, the accommodation tracking module 110 may include by a wavefront sensor to measure the wavefront aberrations in real-time. Accordingly, the accommodation information may include accommodation state, as well as dynamic changes in the optical aberrations of the eye.

Additionally, in some embodiments, the accommodation tracking module 110 may also be able to track a position of a user's eye and/or the diameter of their pupil and infer accommodation via eye tracking. Eye tracking is further described in U.S. patent application Ser. No. 14/963,109 which is incorporated by reference, as above. In these embodiments, the accommodation tracking module 110 determines gaze directions of a user's eyes based on the tracked position of the eyes. The accommodation tracking module 110 estimates a point of intersection or vergence depth using the determined gaze directions. Vergence defines the user's plane of focus for a particular frame of the virtual scene. The accommodation tracking module 110 determines accommodation information based on a location of the determined plane of focus. As gaze lines often do not intersect and are an approximation based on the location of the user's eyes, the vergence depth is an estimate that can be further refined or filtered using geometric data for the virtual scene. Additionally, in some embodiments, eye tracking may also determiner other eye state information, including vergence angle, pupil diameter, detection of blinks, classification of eye movements, including fixations, saccades, smooth pursuits, and other motions. The eye tracker can use this information to either directly or indirectly estimate the accommodation position and other accommodation state parameters.

The locators 114 are objects located in specific positions on the HMD 101 relative to one another and relative to a specific reference point on the HMD 101. A locator 114 may be a light emitting diode (LED), a corner cube reflector, a reflective marker, a type of light source that contrasts with an environment in which the HMD 101 operates, or some combination thereof. Active locators 114 (i.e., an LED or other type of light emitting device) may emit light in the visible band (~380 nm to 750 nm), in the infrared (IR) band (~750 nm to 14,000 nm), in the ultraviolet band (10 nm to 380 nm), some other portion of the electromagnetic spectrum, or some combination thereof. Additionally, in some embodiments, the locators 114 may include light sensors (e.g., photo-diodes, cameras, etc.)

The locators 114 can be located beneath an outer surface of the HMD 101, which is transparent to the wavelengths of light emitted or reflected by locators 114 or is thin enough not to substantially attenuate the wavelengths of light emitted or reflected by the locators 114. Further, the outer surface or other portions of the HMD 101 can be opaque in the visible band of wavelengths of light. Thus, the locators 114 may emit light in the IR band while under an outer surface of the HMD 101 that is transparent in the IR band but opaque in the visible band.

The IMU 116 is an electronic device that generates fast calibration data based on measurement signals received from one or more of the head tracking sensors 118, which generate one or more measurement signals in response to motion of the HMD 101. Examples of the head tracking sensors 118 include accelerometers, gyroscopes, magnetometers, other sensors suitable for detecting motion, correcting error associated with the IMU 116, or some combination thereof. The head tracking sensors 118 may be located external to the IMU 116, internal to the IMU 116, or some combination thereof.

Based on the measurement signals from the head tracking sensors 118, the IMU 116 generates fast calibration data indicating an estimated position of the HMD 101 relative to an initial position of the HMD 101. For example, the head tracking sensors 118 include multiple accelerometers to measure translational motion (forward/back, up/down, left/right) and multiple gyroscopes to measure rotational motion (e.g., pitch, yaw, roll). The IMU 116 can, for example, rapidly sample the measurement signals and calculate the estimated position of the HMD 101 from the sampled data. For example, the IMU 116 integrates measurement signals received from the accelerometers over time to estimate a velocity vector and integrates the velocity vector over time to determine an estimated position of a reference point on the HMD 101. The reference point is a point that may be used to describe the position of the HMD 101. While the reference point may generally be defined as a point in space, in various embodiments, reference point is defined as a point within the HMD 101 (e.g., a center of the IMU 130). Alternatively, the IMU 116 provides the sampled measurement signals to the VR console 150, which determines the fast calibration data.

The IMU 116 can additionally receive one or more calibration parameters from the VR console 150. As further discussed below, the one or more calibration parameters are used to maintain tracking of the HMD 101. Based on a received calibration parameter, the IMU 116 may adjust one or more IMU parameters (e.g., sample rate). In some embodiments, certain calibration parameters cause the IMU 116 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The calibration store 119 is a data store that maintains calibration information. Calibration information is information that maps optical aberration information (also referred to as aberration information) to specific amounts of eye accommodation (and potentially pupil size) for a user of particular demographic profile, user profile including information specific to a user (e.g., measured using a separate calibration device (e.g., a wavefront aberrometer)), or some combination thereof. Optical aberration information may describe, e.g., barrel distortion, pincushion distortion, longitudinal chromatic aberration, transverse chromatic aberration, any other type of two-dimensional optical error, spherical aberration, comatic aberration, field curvature, astigmatism, any other type of three-dimensional optical error, or some combination thereof. The optical aberration information may be specific to the optics block 104, specific to optics of a user's eye (e.g., shape of the cornea), or it may describe the total optical error caused by both the optics block 104 and the optics of the user's eye. Demographic profile information is information that describes a use's physical attributes that may affect their vision. Demographic profile information may include, e.g., age, race, ethnicity, obesity, eye prescription, diabetic, some other attribute that describe their vision, or some combination thereof. In addition to the demographic profile, calibration information may include data measured and/or stored for an individual user, representing characteristics (such as spherical aberration) for which there is wide variation from person to person, and this data may include a user's prescription for optical correction as well, allowing the device to be used without needing spectacles or contact lenses.

The scene rendering module 120 receives content for the virtual scene from the VR engine 156 and provides the content for display on the electronic display 102. Additionally, the scene rendering module 120 can adjust the content based on information from the accommodation tracking module 110, the calibration store 119, the IMU 116, varifocal actuation block 106, and the head tracking sensors 118. For example, upon receiving the content from the VR engine 156, the scene rendering module 120 adjusts the content by adding a pre-distortion into rendering of the virtual scene to compensate or correct for the distortion caused by the optics block 104 and/or eyes of the user. Based on the aberration information, the rendering module 120 determines a focal position for the varifocal actuation block 106 and a pre-distortion to apply to the image for rendering. The scene rendering module 120 then instructs the varifocal actuation block 106 to adjust focus to the determined focal position, and provides the electronic display 102 the pre-distorted image for rendering.

The virtual scene is rendered to produce an aberration-adjusted image that, once displayed, passes through the optics of the HMD 101 and the user's eye, the image that lands on the retina is as close as possible to that which would have landed on the retina if the user were viewing an actual scene in a given accommodative state (including the effects of aberrations from defocus, which contain cues to accommodation) rather than a rendered image of one. In some embodiments, the scene rendering module 120 first renders (in memory) the virtual scene to approximate the image which would actually land on the retina in a real scene with the current accommodation state and pupil size by incorporating the estimated aberrations (determined from the aberration information) of the eye into the rendering process. The scene rendering module 120 simulates aberrations such as distortion, lateral and/or longitudinal aberration as the scene is being rendered. Once this desired retinal image has been produced, the scene rendering module 120 performs an optimization step to generate a corresponding aberration-adjusted image which is presented by the electronic display 102, so that when the aberration-adjusted image passes through the optics block 104 and the user's eye, a retinal image is as close to the desired retinal image as possible.

The imaging device 160 generates slow calibration data in accordance with calibration parameters received from the VR console 150. Slow calibration data includes one or more images showing observed positions of the locators 114 that are detectable by the imaging device 160. The imaging device 160 may include one or more cameras, one or more video cameras, other devices capable of capturing images including one or more the locators 114, or some combination thereof. Additionally, the imaging device 160 may include one or more filters (e.g., for increasing signal to noise ratio). The imaging device 160 is configured to detect light emitted or reflected from the locators 114 in a field of view of the imaging device 160. In embodiments where the locators 114 include passive elements (e.g., a retroreflector), the imaging device 160 may include a light source that illuminates some or all of the locators 114, which retro-reflect the light towards the light source in the imaging device 160. Slow calibration data is communicated from the imaging device 160 to the VR console 150, and the imaging device 160 receives one or more calibration parameters from the VR console 150 to adjust one or more imaging parameters (e.g., focal length, focus, frame rate, ISO, sensor temperature, shutter speed, aperture, etc.).

The VR input interface 170 is a device that allows a user to send action requests to the VR console 150. An action request is a request to perform a particular action. For example, an action request may be to start or end an application or to perform a particular action within the application. The VR input interface 170 may include one or more input devices. Example input devices include a keyboard, a mouse, a game controller, or any other suitable device for receiving action requests and communicating the received action requests to the VR console 150. An action request received by the VR input interface 170 is communicated to the VR console 150, which performs an action corresponding to the action request. In some embodiments, the VR input interface 170 may provide haptic feedback to the user in accordance with instructions received from the VR console 150. For example, haptic feedback is provided by the VR input interface 170 when an action request is received, or the VR console 150 communicates instructions to the VR input interface 170 causing the VR input interface 170 to generate haptic feedback when the VR console 150 performs an action.

The VR console 150 provides content to the HMD 101 for presentation to the user in accordance with information received from the imaging device 160, the HMD 101, or the VR input interface 170. In the example shown in FIG. 1, the VR console 150 includes the application store 152, the tracking module 154, and the virtual reality (VR) engine 156. Some embodiments of the VR console 150 have different or additional modules than those described in conjunction with FIG. 1. Similarly, the functions further described below may be distributed among components of the VR console 150 in a different manner than is described here.

The application store 152 stores one or more applications for execution by the VR console 150. An application is a group of instructions, that when executed by a processor, generates content for presentation to the user. Content generated by an application may be in response to inputs received from the user via movement of the HMD 101 or the VR interface device 170. Examples of applications include gaming applications, conferencing applications, video playback application, or other suitable applications.

The tracking module 154 calibrates the VR system using one or more calibration parameters and may adjust one or more calibration parameters to reduce error in determining position of the HMD 101. For example, the tracking module 154 adjusts the focus of the imaging device 160 to obtain a more accurate position for observed the locators 114 on the HMD 101. Moreover, calibration performed by the tracking module 154 also accounts for information received from the IMU 116. Additionally, if tracking of the HMD 101 is lost (e.g., the imaging device 160 loses line of sight of at least a threshold number of the locators 114), the tracking module 154 re-calibrates some or all of the VR system 100 components.

Additionally, the tracking module 154 tracks the movement of the HMD 101 using slow calibration information from the imaging device 160 and determines positions of a reference point on the HMD 101 using observed locators from the slow calibration information and a model of the HMD 101. Tracking module 154 also determines positions of the reference point on the HMD 101 using position information from the fast calibration information from the IMU 116 on the HMD 101. Additionally, the tracking module 154 may use portions of the fast calibration information, the slow calibration information, or some combination thereof, to predict a future location of the HMD 101, which is provided to the VR engine 156.

The VR engine 156 executes applications within the VR system 100 and receives position information, acceleration information, velocity information, predicted future positions, or some combination thereof for the HMD 101 from the tracking module 154. Based on the received information, the VR engine 156 determines content to provide to the HMD 101 for presentation to the user, such as a virtual scene. For example, if the received information indicates that the user has looked to the left, the VR engine 156 generates content for the HMD 101 that mirrors or tracks the user's movement in a virtual environment. Additionally, the VR engine 156 performs an action within an application executing on V the R console 150 in response to an action request received from the VR input interface 170 and provides feedback to the user that the action was performed. The provided feedback may be visual or audible feedback via the HMD 101 or haptic feedback via the VR input interface 170.

Figure 2A:
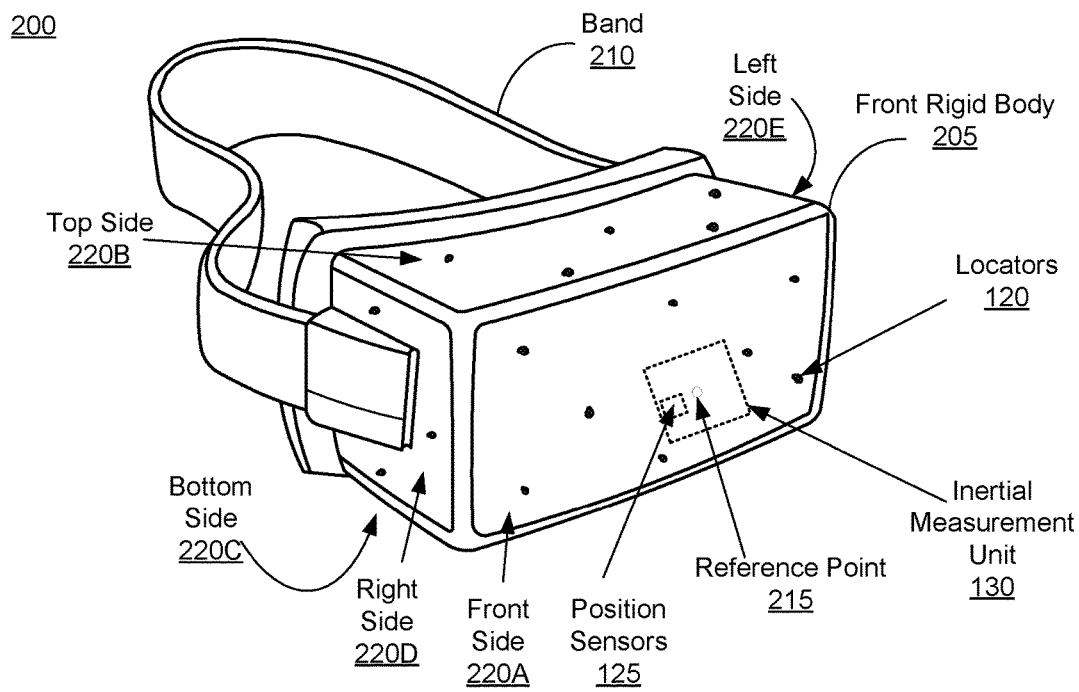
FIG. 2A is a diagram of a head-mounted display, in accordance with an embodiment.

FIG. 2A is a wire diagram of a HMD 200, in accordance with an embodiment. The HMD 200 is an embodiment of the HMD 100, and includes a front rigid body 205 and a band 210. The front rigid body 205 includes one or more electronic display elements of the electronic display 115 (not shown), the IMU 130, the one or more position sensors 125, and the locators 120. In the embodiment shown by FIG. 2A, the position sensors 125 are located within the IMU 130, and neither the IMU 130 nor the position sensors 125 are visible to the user.

The locators 120 are located in fixed positions on the front rigid body 205 relative to one another and relative to a reference point 215. In the example of FIG. 2A, the reference point 215 is located at the center of the IMU 130. Each of the locators 120 emit light that is detectable by the imaging device 135. Locators 120, or portions of locators 120, are located on a front side 220A, a top side 220B, a bottom side 220C, a right side 220D, and a left side 220E of the front rigid body 205 in the example of FIG. 2A.

Figure 2B:
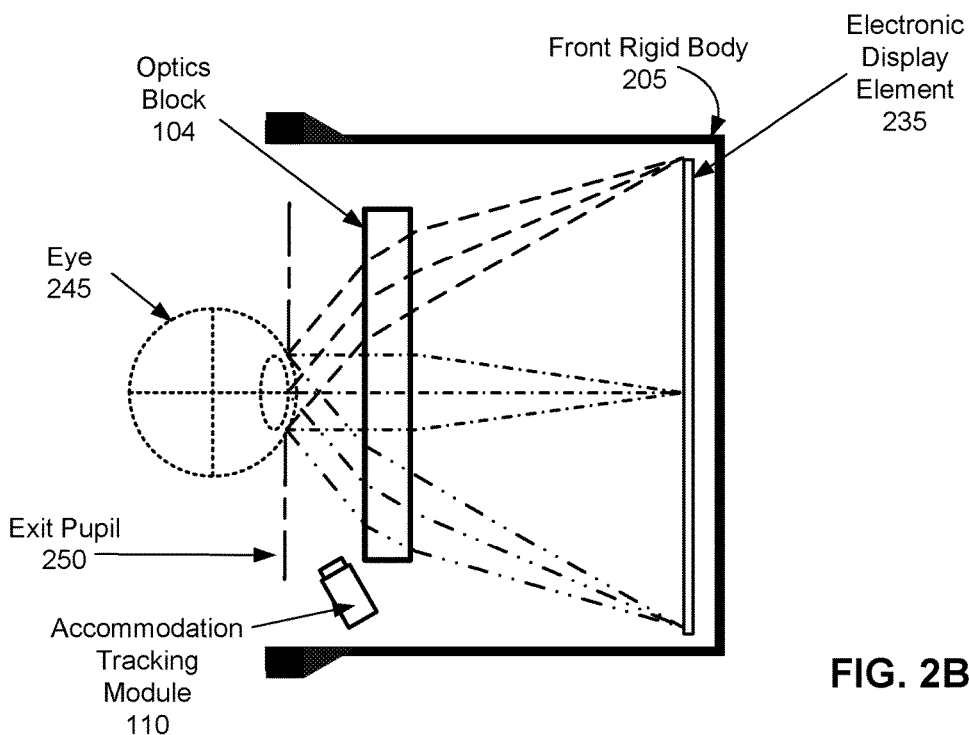
FIG. 2B is a cross-section view of a front rigid body of the head-mounted display in FIG. 2A, in accordance with an embodiment.

FIG. 2B is a cross section 225 of the front rigid body 205 of the embodiment of the HMD 200 shown in FIG. 2A. As shown in FIG. 2B, the front rigid body 205 includes an electronic display element 235, an optics block 104, and an accommodation tracking module 110. The electronic display element 235 emits pre-distorted light toward the optics block 104.

The accommodation tracking module 110 measures accommodation of a user's eye 245. As discussed in detail below with regard to FIG. 3, based on the measured accommodation, the image may be pre-distorted prior to rendering to mitigate optical aberrations that are introduced by the optics block 104, and in some embodiments, also reproduce optical aberrations introduced by an eye 245 of the user as a function of accommodation distance.

The optics block 104 alters (e.g., magnifies) the received light and provides it to an exit pupil 250 for presentation to the user. Additionally, the optics block 104 may introduce aberrations into the image light. However, the pre-distortion in the image light mitigates the aberrations introduced by the optics block 103. Moreover, a focal length and/or back focal length spacing of the optics block 104 may be varied by the varifocal actuation block 106 (not shown for simplicity). For example, the varifocal actuation block 106 may adjust one or more optical elements within the optics block 104 to affect the focal length of the optics block 104. The adjusted focal length may help mitigate optical aberrations. In addition, the optics block 104 may be further adjusted to reduce or eliminate the need for prescription correction for users who might otherwise need to wear spectacles or contact lenses in the system. Light from the optics block 104 is directed to an exit pupil 250. In some embodiments, the optics block 104 is designed to preserve the aberrations of the human eye (e.g. longitudinal chromatic aberration, which defocuses in some colors in traditional displays). This can be accomplished via techniques such as diffractive optics, through inducing an optical depth offset for each separate color channel across the display, by otherwise designing the optical system to place the image in focus on the retina across key wavelengths (e.g. the peaks of the display primaries), or some combination thereof. Accordingly, the pixel array may be imaged onto the retina with minimal aberration, allowing for more precise generation and control of image quality and cues such as accommodation to the visual system.

The exit pupil 250 is the location of the front rigid body 205 where a user's eye 245 is positioned. For purposes of illustration, FIG. 2B shows a cross section 225 associated with a single eye 245, but another optics block, separate from the optics block 104, provides altered image light to another eye of the user.

Figure 3:
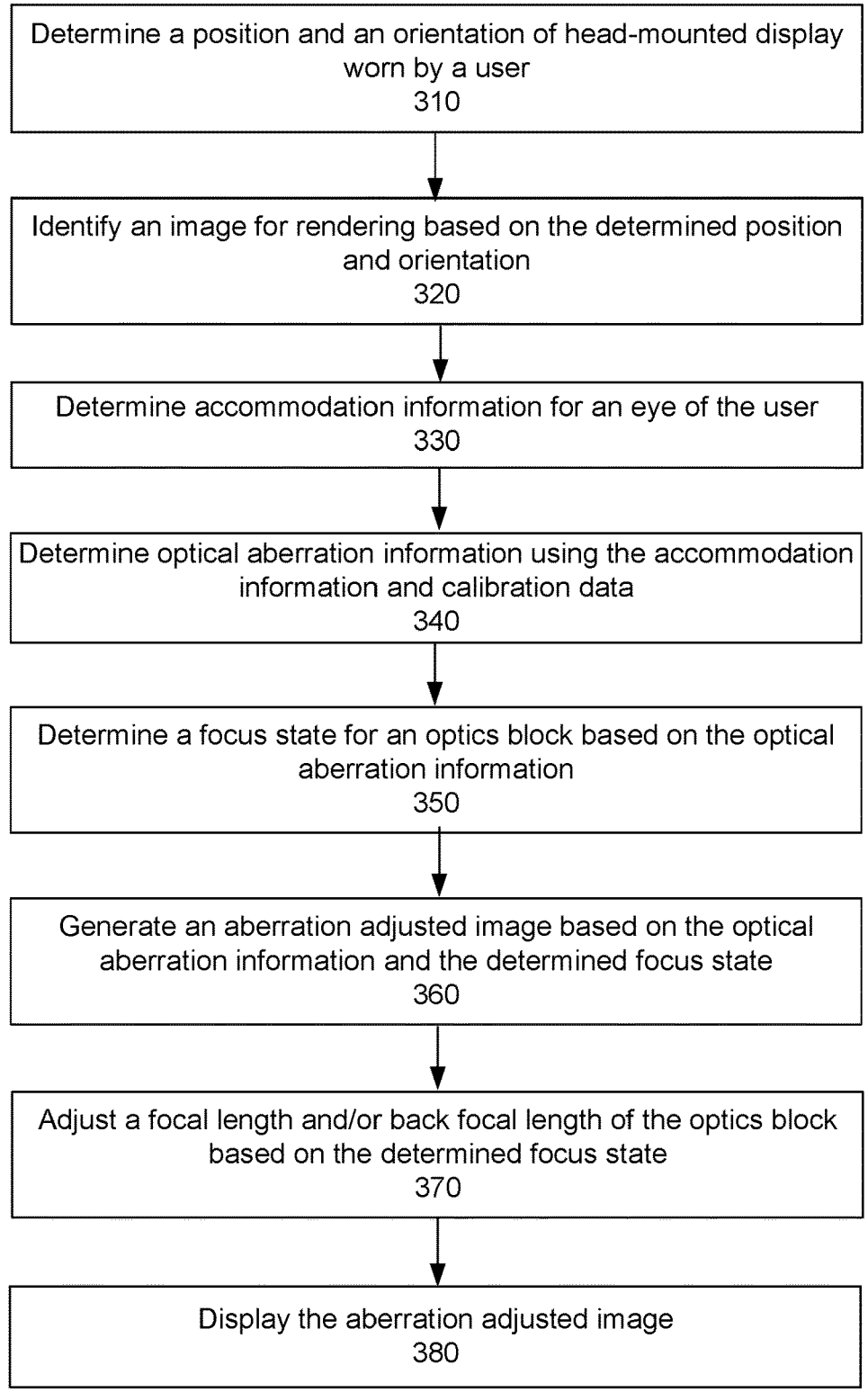
FIG. 3 is a process for generating aberration-adjusted images, in accordance with at least one embodiment.

FIG. 3 is a flowchart of a process 300 for generating aberration-adjusted images, in accordance with at least one embodiment. The process 300 may be performed by the system 100 in some embodiments. Alternatively, other components may perform some or all of the steps of the process 300 (e.g., the VR console 150 and/or the HMD 101). Additionally, the process 300 may include different or additional steps than those described in conjunction with FIG. 3 in some embodiments or perform steps in different orders than the order described in conjunction with FIG. 3.

The system 100 determines 310 a position and an orientation of the HMD 101 worn by a user. In the embodiment shown by FIG. 3, a position, an orientation, and/or a movement of HMD 101 are determined by a combination of the locators 114, the IMU 116, the head tracking sensors 118, the imagining device 160, and the tracking module 154, as described above in conjunction with FIG. 1. Portions of a virtual scene presented by the HMD 101 are mapped to various positions and orientations of the HMD 101. Thus, a portion of the virtual scene currently viewed by a user is determined based on the position, orientation, and movement of HMD 101.

The system 100 identifies 320 an image for rendering based on the determined position and orientation of the HMD 101. For example, given position and orientation information, the VR console 150 identifies what media (e.g., image, audio, etc.) that should be provided to the HMD 101 for presentation to the user.

The system 100 determines 330 accommodation information for an eye of the user. The system 100 may determine accommodation information using, e.g., techniques such as the Scheiner principle, wavefront aberrometry, image quality analysis, a Badal optometer, optical coherent tomography/imaging, or some combination thereof. Alternatively, the accommodative state of the eyes can be estimated from eyetracking data by triangulation using interpupillary distance and vergence of the user's eyes. In some embodiments, the system 100 illuminates portions of the eye of the user with an IR source (e.g., IR laser). The system 100 captures one or more images of the illuminated portions of the eye using a detector (e.g., a small camera). The system 100 determines a shape of a crystalline lens within the eye using the captured one or more images. For example, the system 100 may use a model that maps a shape of a crystalline lens to respective accommodation information.

The system 100 determines 340 optical aberration information using the accommodation information and calibration data. Since the calibration store contains estimates or measurements of aberrations for a range of accommodative states (and potentially pupil sizes), this operation involves indexing into this calibration store based on the current estimate of accommodation. The system 100 applies the accommodation information to calibration data to get corresponding aberration information.

The system 100 determines 350 a focus state for an optics block 104 of the HMD 101 based on the optical aberration information. Given optical aberration information, the system 100 determines a focus state to mitigate some or all of the optical aberrations described by the optical aberration information. Since the system 100 has an estimate of the optical state of the eye from accommodation measurement, calibration data, pupil measurement, or some combination thereof, it then updates the state of the optics block to bring the electronic display 102 into focus, e.g. by placing the apparent image at the distance to which the eye is focused. Variants of this technique may improve it further by displacing the optics block from this point to maximize one or more optical quality metrics such as the modulation transfer function (MTF).

The system 100 generates 360 an aberration-adjusted image based on the optical aberration information and the determined focus state. Given optical aberration information and the determined focus state, the system 100 determines how an image should be pre-distorted to mitigate some or all of the optical aberrations described by the optical aberration information. In some embodiments, the system 100 renders in memory the virtual scene to approximate an image which would actually land on the retina in a real scene based in part on the current accommodation state of the user and a pupil size of the user. The system 100 incorporates the estimated aberrations determined from the aberration information of the eye into the rendering process. The system 100 simulates aberrations such as distortion or longitudinal aberration as the scene is being rendered. For example, simulated aberrations may include the aberrations which would have resulted from a user viewing a real scene that corresponds to the image, among them depth cues such as defocus and longitudinal chromatic aberration. Once this desired retinal image has been produced, the system 100 performs an optimization step (e.g. using deconvolution of the image via the point-spread function of the complete optical system) to produce a corresponding aberration-adjusted image. In some embodiments, the optimization step includes adjusting the desired retinal image to account for the focus state of the optics block 104.

The system 100 adjusts 370 a focal length and/or back focal length of the optics block 104 based on the determined focus state. For example, the system 100 may instruct a varifocal element in the HMD 101 to adjust position of one or more optical elements in the optics block 104 that cause the focal length of the optics block 104 to change. Adjusting the focal length allows an image to be displayed so that it is in focus on the retina at the eye's current accommodation state, something which cannot be accomplished by merely distorting an out-of-focus image.

The system 100 displays 380 the aberration-adjusted image. The aberration-adjusted image is displayed by the electronic display 102. The aberration-adjusted image passes through the optics block 104 that is in the determined focus state. The pre-distortion applied to the aberration-adjusted image and the focal length of the optics block 104 result in a mitigation of optical aberration introduced by the optics block 104. Additionally, in some embodiments, the pre-distortion applied to the aberration-adjusted image and the focal length of the optics block 104 also result in a mitigation of aberrations introduced by optics of the user's eye (e.g., shape of the cornea). Accordingly, the image light as imaged onto a retina of a user's eye may be an aberration-adjusted image. As discussed above an aberration-adjusted image is an image distorted to correct aberrations that would otherwise occur at a retina of the user due to image light passing through optics of the HMD and optics of the user's eyes.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A head mounted display (HMD) comprising:
at least one processor;
an electronic display element configured to display a virtual scene to a user wearing the HMD;
an optics block configured to direct light from the electronic display element to an exit pupil of the HMD;
an eye tracking system configured to determine an eye position of each eye of the user; and
memory including instructions that, when executed by the at least one processor, cause the at least one processor to:
determine a position and orientation of the HMD worn by the user;
identify, for a frame of the virtual scene, an image for rendering based on the determined position and orientation of the HMD;
determine an accommodative state of a plurality of accommodative states for an eye of the user based on the eye position of each eye of the user;
determine optical aberration information for the determined eye position of each eye of the user for the determined accommodative state, the optical aberration information corresponding to one or more optical aberrations caused by the optics block as the light from the electronic display element passes through the optics block to the exit pupil, the optical aberration information being different for at least one eye position relative to other eye positions within at least one of the plurality of accommodative states;
determine a focus state for the optics block corresponding to a combination of the accommodative state and the determined eye position of the user, the determined focus state being mapped to a distortion correction of a plurality of distortion corrections, each distortion correction adding pre-distortion to the content for the determined focus state; and
display the identified image for the frame of the virtual scene on the electronic display element with the pre-distortion of the distortion correction for the determined focus state, the light of the image displayed with the pre-distortion being complementarily distorted by the optics block.

2. The HMD of claim 1, wherein determining the accommodation information for the eye of the user includes:
determining vergence of the user's eyes based on the eye position of each eye of the user; and
triangulating the accommodation information based on the determined vergence and an interpupillary distance between each eye of the user.

3. The HMD of claim 1, wherein determining the accommodation information for the eye of the user includes:
illuminating each eye of the user with an infrared (IR) light source;
capturing one or more images of each eye of the user with an IR detector;
determining a shape of a lens of each eye of the user from the captured one or more images; and
comparing the shape of the lens of each eye to a model that maps shapes of eye lenses to accommodation states to determine the accommodation information.

4. The HMD of claim 1, wherein the optical aberration information is determined by:
estimating optical aberration measurements for the optics block for each of a range of accommodative states, each accommodative state being based at least in part on a different eye position; and
indexing the optical aberration measurements by eye position.

5. The HMD of claim 4, wherein the one or more optical aberrations include at least one of field curvature or chromatic aberration.

6. The HMD of claim 1, further comprising:
a varifocal actuation block configured to change a focal length of the optics block based at least in part on accommodation information and, wherein the instructions that, when executed by the at least one processor, further cause the at least one processor to:
adjust a focal length of the optics block based on the determined focus state using the varifocal actuation block.

7. The HMD of claim 6, wherein adjusting the focal length of the optics block includes:
changing a distance between the optics block and the electronic display element to provide accommodation for the determined focus state.

8. A method comprising:
determining, by a head-mounted display (HMD), a position and orientation of the HMD worn by a user viewing content displayed by the HMD, the HMD directing light from an electronic display element presenting the content to an exit pupil of the HMD via an optics block;
identifying, for a frame of the content, an image for rendering based on the determined position and orientation of the HMD;
determining, by the HMD, an eye position for each eye of the user;
determining an accommodative state of a plurality of accommodative states for an eye of the user based on the eye position for each eye of the user;
determining optical aberration information for the determined eye position of each eye of the user for the determined accommodative state, the optical aberration information corresponding to one or more optical aberrations caused by the optics block as light from the electronic display element passes through the optics block to the exit pupil, the optical aberration information being different for at least one eye position relative to other eye positions within at least one of the plurality of accommodative states;
determining a focus state for the optics block corresponding to a combination of the accommodative state and the determined eye position of the user, the determined focus state being mapped to a distortion correction of a plurality of distortion corrections, each distortion correction adding pre-distortion to the content for the determined focus state; and
displaying, based on the determined focus state, the identified image for the frame of the content on the electronic display element with the pre-distortion of the distortion correction, the light of the image displayed with the pre-distortion is complementarily distorted by the optics block to mitigate the one or more optical aberrations caused by the optics block for the determined eye position.

9. The method of claim 8, further comprising:
tracking each eye of the user to an updated position for an additional image of an additional frame of the content;

determining updated optical aberration information for the updated position of each eye of the user;

selecting an updated focus state for the updated position of each eye of the user relative to the exit pupil from the focus state; and displaying the additional image for focusing to the exit pupil by the optics block after application of the updated focus state.

10. The method of claim 8, wherein determining the accommodation information for the eye of the user includes:

determining vergence of the user's eyes based on the eye position of each eye of the user; and triangulating the accommodation information based on the determined vergence and an interpupillary distance between each eye of the user.

11. The HMD of claim 8, wherein determining the accommodation information for the eye of the user includes:

illuminating each eye of the user with an infrared (IR) light source;

capturing one or more images of each eye of the user with an IR detector;

determining a shape of a lens of each eye of the user from the captured one or more images; and comparing the shape of the lens of each eye to a model that maps shapes of eye lenses to accommodation states to determine the accommodation information.

12. The HMD of claim 8, wherein the optical aberration information is determined by:

estimating optical aberration measurements for the optics block for each of a range of accommodative states for one or more users, each accommodative state being based at least in part on a different eye position of the one or more users; and indexing the optical aberration measurements by eye position.

13. The method of claim 8, further comprising:

adjusting a focal length of the optics block based on the determined focus state using a varifocal actuation block.

14. The method of claim 13, wherein adjusting the focal length of the optics block includes:

changing a distance between the optics block and the electronic display element to provide accommodation for the determined focus state.

15. The method of claim 13, wherein the varifocal actuation block is configured to change the focal length of the optics block by changing a shape or optical path length of a lens included in the optics block to provide accommodation for the determined focus state.

16. The method of claim 15, wherein changing the shape or optical path length of the lens of the optics block includes using at least one selected from a group consisting of: a shape-changing polymer lens, a liquid lens and electrowetting, an Alvarez-Lohmann lens, a deformable membrane mirror, a liquid crystal (electroactive) lens, a phase-only spatial light modulator (SLM), and any combination thereof.

17. A head mounted display (HMD) comprising:

at least one processor;

an electronic display element configured to display a virtual scene to a user wearing the HMD;

an optics block configured to direct light from the electronic display element to an exit pupil of the HMD;

an eye tracking system including an image capturing element, the eye tracking system configured to determine an eye position of each eye of the user;

a varifocal actuation block configured to change a focal length of the optics block based at least in part on accommodation information; and memory including instructions that, when executed by the at least one processor, cause the at least one processor to:

determine a position and orientation of the HMD worn by the user;

identify, for a frame of the virtual scene, an image for rendering based on the determined position and orientation of the HMD;

determine an accommodative state of a plurality of accommodative states for an eye of the user based on the eye position of each eye of the user;

determine optical aberration information for the determined eye position of each eye of the user for the determined accommodative state, the optical aberration information corresponding to one or more optical aberrations caused by the optics block as light from the electronic display element passes through the optics block to the exit pupil, the optical aberration information being different for at least one eye position relative to other eye positions within at least one of the plurality of accommodative states;

determine a focus state for the optics block corresponding to a combination of the accommodative state and the determined eye position of the user, the determined focus state being mapped to a pre-distortion correction of a plurality of pre-distortion corrections, each distortion correction adding pre-distortion to the content for the determined focus state;

adjust a focal length of the optics block based on the determined focus state using the varifocal actuation block; and display the identified image for the frame of the virtual scene on the electronic display element with the pre-distortion of the distortion correction for the determined focus state, the light of the image displayed with the pre-distortion being complementarily distorted by the optics block to mitigate the one or more optical aberrations caused by the optics block for the determined eye position.

18. The HMD of claim 17, wherein determining the accommodation information for the eye of the user includes:

determining vergence of the user's eyes based on the eye position of each eye of the user; and triangulating the accommodation information based on the determined vergence and an interpupillary distance between each eye of the user.

19. The HMD of claim 17, wherein determining the accommodation information for the eye of the user includes:

illuminating each eye of the user with an infrared (IR) light source;

capturing one or more images of each eye of the user with an IR detector;

determining a shape of a lens of each eye of the user from the captured one or more images; and comparing the shape of the lens of each eye to a model that maps shapes of eye lenses to accommodation states to determine the accommodation information.

20. The HMD of claim 17, wherein the optical aberration information is determined by:

estimating optical aberration measurements for the optics block for each of a range of accommodative states, each accommodative state being based at least in part on a different eye position; and indexing the optical aberration measurements by eye position.

* * * * *